(12) United States Patent
Liu et al.

(10) Patent No.: US 9,379,382 B2
(45) Date of Patent: *Jun. 28, 2016

(54) POSITIVE ELECTRODE MATERIALS FOR LITHIUM-ION BATTERIES AND METHOD FOR PREPARING THE SAME

(71) Applicants: Jianhong Liu, Shenzhen (CN); Hongzhen Zhang, Shenzhen (CN); Qianling Zhang, Shenzhen (CN); Dayong Gui, Shenzhen (CN); Chuanxin He, Shenzhen (CN); Caizhen Zhu, Shenzhen (CN)

(72) Inventors: Jianhong Liu, Shenzhen (CN); Hongzhen Zhang, Shenzhen (CN); Qianling Zhang, Shenzhen (CN); Dayong Gui, Shenzhen (CN); Chuanxin He, Shenzhen (CN); Caizhen Zhu, Shenzhen (CN)

(73) Assignee: SHENZHEN EIGEN-EQUATION GRAPHENE TECHNOLOGY CO., LTD., Shenzhen (CN)

( * ) Notice: Subject to any disclaimer, the term of this patent is extended or adjusted under 35 U.S.C. 154(b) by 212 days.

This patent is subject to a terminal disclaimer.

(21) Appl. No.: 14/133,678

(22) Filed: Dec. 19, 2013

(65) Prior Publication Data

US 2014/0103264 A1 Apr. 17, 2014

Related U.S. Application Data

(63) Continuation-in-part of application No. PCT/CN2012/076963, filed on Jun. 15, 2012.

(30) Foreign Application Priority Data

Jun. 21, 2011 (CN) .......................... 2011 1 0166476

(51) Int. Cl.
| | | |
|---|---|---|
| *H01B 1/04* | (2006.01) | |
| *H01M 4/04* | (2006.01) | |
| *C01B 31/02* | (2006.01) | |
| *H01M 4/505* | (2010.01) | |
| *H01M 4/1391* | (2010.01) | |
| *H01M 4/36* | (2006.01) | |
| *H01M 4/62* | (2006.01) | |
| *H01M 10/052* | (2010.01) | |

(52) U.S. Cl.
CPC ............ *H01M 4/505* (2013.01); *H01M 4/1391* (2013.01); *H01M 4/366* (2013.01); *H01M 4/625* (2013.01); *H01M 10/052* (2013.01); *Y02E 60/122* (2013.01)

(58) Field of Classification Search
CPC ................................ H01B 1/04; H01M 4/505
USPC ................ 252/500–519.1, 182.1; 423/445 R; 429/217

See application file for complete search history.

(56) References Cited

U.S. PATENT DOCUMENTS

| | | | |
|---|---|---|---|
| 5,540,981 A | * | 7/1996 | Gallagher et al. ............ 428/220 |
| 2004/0067740 A1 | * | 4/2004 | Handa et al. ................ 455/127.1 |
| 2004/0247999 A1 | * | 12/2004 | Shirane et al. ................ 429/161 |
| 2009/0239149 A1 | * | 9/2009 | Choi et al. .................... 429/224 |
| 2012/0202056 A1 | * | 8/2012 | Wolf et al. .................... 428/336 |
| 2013/0157135 A1 | * | 6/2013 | Zhou et al. .................... 429/221 |
| 2013/0171502 A1 | * | 7/2013 | Chen ...................... H01G 11/06 429/149 |

FOREIGN PATENT DOCUMENTS

| | | | | |
|---|---|---|---|---|
| CN | 1338786 | * | 3/2002 | ............. C04B 35/01 |
| CN | 101521276 | * | 9/2009 | ............. H01M 4/04 |
| CN | 101587950 | * | 11/2009 | ............ H01M 10/24 |
| WO | WO2012031401 | * | 3/2012 | ............. H01M 4/36 |

* cited by examiner

*Primary Examiner* — Tri V Nguyen

(74) *Attorney, Agent, or Firm* — Matthias Scholl P.C.; Matthias Scholl

(57) ABSTRACT

A method for modifying a positive electrode material for a lithium-ion battery. The method includes: a) grinding a mixture of manganese dioxide and lithium carbonate, and calcining the mixture at no less than a temperature of 600° C. for no less than 20 hrs in the presence of air, to yield a powdery lithium manganese oxide ($LiMn_2O_4$); b) adding a precursor for forming a graphene-like structure to the powdery $LiMn_2O_4$, mixing, curing at a constant temperature of no less than 180° C. for between 2 and 4 hrs, grinding, and calcining at no less than a temperature of 500° C. for between 1 and 50 hrs in the presence of an inert gas, to yield a composite powder comprising a graphene-like structure and $LiMn_2O_4$; and c) collecting and sintering the composite powder at a temperature of between 300 and 500° C. for between 1 and 10 hrs in the presence of air.

9 Claims, 3 Drawing Sheets

POSITIVE ELECTRODE MATERIALS FOR LITHIUM-ION BATTERIES AND METHOD FOR PREPARING THE SAME

CROSS-REFERENCE TO RELATED APPLICATIONS

This application is a continuation-in-part of International Patent Application No. PCT/CN2012/076963 with an international filing date of Jun. 15, 2012, designating the United States, now pending, and further claims priority benefits to Chinese Patent Application No. 201110166476.9 filed Jun. 21, 2011. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to the field of chemical batteries, and more particularly to a positive electrode material for a lithium-ion battery and a preparation method thereof.

2. Description of the Related Art

As a new generation of high-energy battery, the lithium-ion battery features light weight, high power density, high working voltage, and pollution free. Positive electrode materials are critical for manufacturing of the lithium-ion secondary battery, and are the primary factor to determine the performance and the value of the lithium-ion battery.

Studies of the positive electrode material for the lithium-ion battery are mainly focused on lithium-transition metal composite oxides, which include: $LiCoO_2$, $LiNiO_2$, $LiMn_2O_4$, and other ternary materials. These positive electrode materials have different disadvantages. For example, $LiCoO_2$ is expensive and has low safety performance. $LiNiO_2$ has a low working voltage and complex synthesis.

$LiMn_2O_4$ is characterized in its good stability, pollution free, high working voltage, low price, and convenient synthesis, and thus is widely used for preparation of a positive electrode material for a lithium-ion battery. However, as a positive electrode material, $LiMn_2O_4$ has the following defects: 1. Upon $LiMn_2O_4$ discharging, Jahn-Teller effect occurs, thereby destroying the spinel structure of $LiMn_2O_4$ and affecting the capacity and cycle performance thereof; 2. $LiMn_2O_4$ is solvent-sensitive in an electrolyte; and 3. the electrolyte is prone to decompose whereby producing a passive film on the surface of the electrode and resulting in self-discharge phenomenon. As a result, conventional positive electrode materials made of $LiMn_2O_4$ have an obvious capacity loss in use.

SUMMARY OF THE INVENTION

In view of the above-described problems, it is one objective of the invention to provide a method for modifying a positive electrode material for a lithium-ion battery. The resulting positive electrode material modified using the method has a stable spinel structure, low solubility in electrolytes, low capacity loss, and outstanding cycle performance.

To achieve the above objective, in accordance with one embodiment of the invention, there is provided a method for modifying a positive electrode material for a lithium-ion battery, the method comprising the following steps:

a) providing a mixture of manganese dioxide and lithium carbonate, grinding the mixture using a ball mill, and calcining the mixture at no less than a temperature of 600° C. for no less than 20 hrs in the presence of air, to yield a powdery lithium manganese (III, IV) oxide ($LiMn_2O_4$);

b) adding a precursor for forming a graphene-like structure to the powdery $LiMn_2O_4$, mixing, curing at a constant temperature of no less than 180° C. for between 2 and 4 hrs, grinding, and calcining at no less than a temperature of 500° C. for between 1 and 50 hrs in the presence of an inert gas, to yield a composite powder comprising a graphene-like structure and $LiMn_2O_4$; and collecting the composite powder comprising the graphene-like structure and $LiMn_2O_4$, and sintering the composite powder at a temperature of between 300 and 500° C. for between 1 and 10 hrs in the presence of air, to yield the positive electrode material for the lithium-ion battery comprising graphene-like structure cladded $LiMn_2O_4$.

In a class of this embodiment, in the mixture in step a), a molar ratio of manganese dioxide to lithium carbonate is between 4:1 and 4:1.2.

In a class of this embodiment, in step a), the mixture is calcined at a temperature of between 600 and 800° C. for between 20 and 50 hrs.

In a class of this embodiment, the precursor for forming the graphene-like structure is polyacrylonitrile.

In a class of this embodiment, in step b), a weight ratio of the polyacrylonitrile to $LiMn_2O_4$ is between 0.01:1 and 0.2:1.

In a class of this embodiment, the polyacrylonitrile is in the form of liquid having a relative molecular weight of between 106 and 5,000.

In a class of this embodiment, in step b), a curing temperature is between 180 and 240° C.

In a class of this embodiment, in step b), the inert gas is nitrogen or argon, and a calcining temperature is between 500 and 750° C.

In a class of this embodiment, the graphene-like structure comprises between 10 and 100 stacked two-dimensional layers, and each layer comprises grid-like crystal lattice formed by covalent bonded single atoms.

In another aspect, the invention further provides a positive electrode material for a lithium-ion battery modified according to the method, the modified positive electrode material comprising a graphene-like structure cladded $LiMn_2O_4$.

The method for modifying a positive electrode material for a lithium-ion battery and the resulting modified positive electrode material have low costs, convenient operation, and high production. The graphene-like structure is cladded on the surface of $LiMn_2O_4$, thereby weakening the irreversible conformational change of $LiMn_2O_4$ resulting from the Jahn-Teller effect. Meanwhile, the graphene-like structure prevents the electrolyte from contacting with $LiMn_2O_4$, thereby reducing the dissolution and self-discharge of manganese ions in the electrolyte. The graphene-like structure is evenly distributed in the particles of $LiMn_2O_4$, thereby narrowing the gaps, improving the electrical conductivity, and producing high performance of positive electrode materials for lithium-ion batteries.

DETAILED DESCRIPTION OF THE EMBODIMENTS

Figure 1:
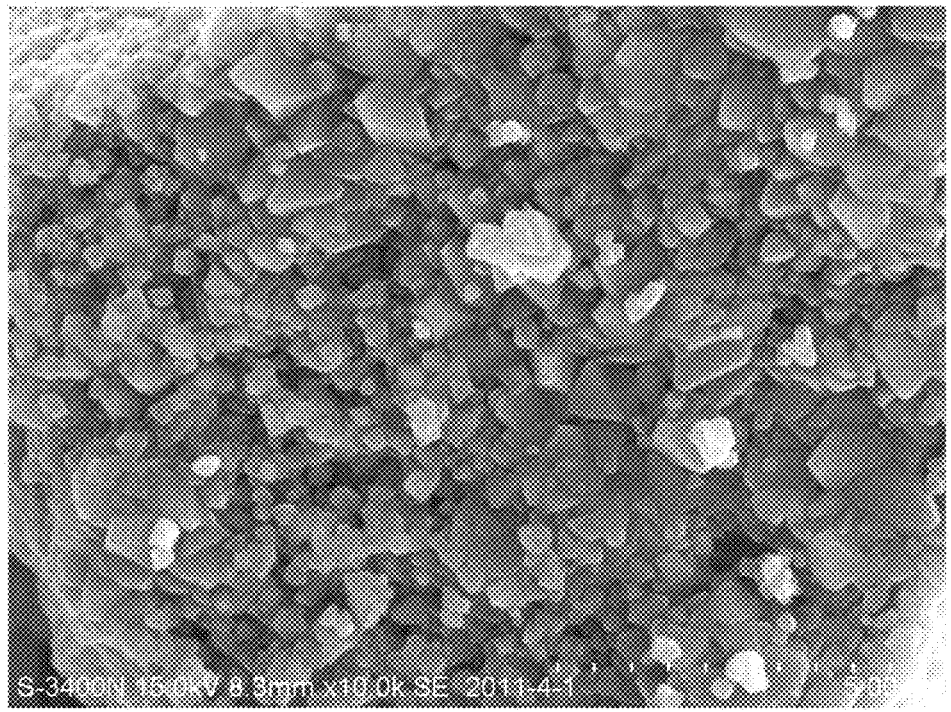
FIG. 1 is a scanning electron microscope (SEM) image of a positive electrode material for a lithium-ion battery in accordance with one embodiment of the invention.

For further illustrating the invention, experiments detailing a positive electrode material for a lithium-ion battery and a preparation method thereof are described below. It should be noted that the following examples are intended to describe and not to limit the invention.

A method for modifying a positive electrode material for a lithium-ion battery, comprises the following steps:
  a) providing a mixture of manganese dioxide and lithium carbonate, grinding the mixture using a ball mill, and calcining the mixture at no less than a temperature of 600° C. for no less than 20 hrs in the presence of air, to yield a powdery lithium manganese (III, IV) oxide ($LiMn_2O_4$);
  b) adding a precursor for forming a graphene-like structure to the powdery $LiMn_2O_4$, mixing, curing at a constant temperature of no less than 180° C. for between 2 and 4 hrs, grinding, and calcining at no less than a temperature of 500° C. for between 1 and 50 hrs in the presence of an inert gas, to yield a composite powder comprising a graphene-like structure and $LiMn_2O_4$; and
  c) collecting the composite powder comprising the graphene-like structure and $LiMn_2O_4$, and sintering the composite powder at a temperature of between 300 and 500° C. for between 1 and 10 hrs in the presence of air, to yield the positive electrode material for the lithium-ion battery comprising graphene-like structure cladded $LiMn_2O_4$.

Manganese dioxide and lithium carbonate can be purchased from the market. After the polyacrylonitrile is calcined, a carbon cladding is formed on the surface of the particles of the powdery $LiMn_2O_4$, and the carbon cladding can reduce $LiMn_2O_4$ cladded therein. Thus, the oxygen ratio of $LiMn_2O_4$ decreases. When the composite powder comprising the graphene-like structure and $LiMn_2O_4$ is exposed in the air again, oxygen is introduced into $LiMn_2O_4$, thereby forming a stable $LiMn_2O_4$ crystal, which improves the cycle performance of the products.

In the mixture in step a), a molar ratio of manganese dioxide to lithium carbonate is between 4:1 and 4:1.2. The mixture is calcined at a temperature of between 600 and 800° C. for between 20 and 50 hrs.

The precursor for forming the graphene-like structure is polyacrylonitrile. In step b), a weight ratio of the polyacrylonitrile to $LiMn_2O_4$ is between 0.01:1 and 0.2:1. The polyacrylonitrile is in the form of liquid having a relative molecular weight of between 106 and 5,000. In step b), a curing temperature is between 180 and 240° C. During subsequent calcination, the inert gas is nitrogen or argon, a calcining temperature is between 500 and 750° C., and a calcining time is between 1 and 50 hrs.

The positive electrode material for a lithium-ion battery prepared according to the above mentioned method comprises graphene-like structure cladded $LiMn_2O_4$.

In step a), for facilitating the uniform mixing of manganese dioxide and lithium carbonate, an appropriate amount of a low-boiling organic solvent such as ethanol can be added during mixing. Because the low-boiling organic solvent is volatile, the addition thereof has no effect on the properties of the final product.

Example 1

1) 0.08 mol of $Li_2CO_3$, 0.32 mol of $MnO_2$, and 20 mL of anhydrous ethanol were mixed (Li:Mn=1:4) and ground in a ball-milling tank at 400 rpm for 15 hrs. The resulting mixture was collected and allowed to stand at room temperature for 8 hrs. Thereafter, the mixture was screened using a 200 mesh sieve, and then calcined at 600° C. for 50 hrs in the presence of air, to yield a powdery lithium manganese (III, IV) oxide ($LiMn_2O_4$).

2) The powdery $LiMn_2O_4$ obtained in step 1) was added to a liquid polyacrylonitrile (LPAN), in which the weight ratio of $LiMn_2O_4$ to the liquid polyacrylonitrile was 1:0.01, and appropriate amount of ethanol was added as a solvent for ultrasonic dispersion. Thereafter, the solution was dried at room temperature for removal of the ethanol. The solution was cured at 180° C. for 6 hrs. The collected product was ground, and then calcined at 500° C. for 40 hrs in the presence of nitrogen, to yield a composite powder comprising a graphene-like structure and $LiMn_2O_4$.

3) The composite powder obtained in step 2) was sintered at 300° C. for 10 hrs in the presence of air, to yield a positive electrode material for the lithium-ion battery comprising graphene-like structure cladded $LiMn_2O_4$.

Example 2

1) 0.084 mol of $Li_2CO_3$, 0.32 mol of $MnO_2$, and 20 mL of anhydrous ethanol were mixed (Li:Mn=1.05:4) and ground in a ball-milling tank at 400 rpm for 15 hrs. The resulting mixture was collected and allowed to stand at room temperature for 8 hrs. Thereafter, the mixture was screened using a 200 mesh sieve, and then calcined at 650° C. for 45 hrs in the presence of air, to yield a powdery lithium manganese (III, IV) oxide ($LiMn_2O_4$).

2) The powdery $LiMn_2O_4$ obtained in step 1) was added to a liquid polyacrylonitrile (LPAN), in which the weight ratio of $LiMn_2O_4$ to the liquid polyacrylonitrile was 1:0.05, and appropriate amount of ethanol was added as a solvent for ultrasonic dispersion. Thereafter, the solution was dried at room temperature for removal of the ethanol. The solution was cured at 200° C. for 4 hrs. The collected product was ground, and then calcined at 550° C. for 8 hrs in the presence of nitrogen, to yield a composite powder comprising a graphene-like structure and $LiMn_2O_4$.

3) The composite powder obtained in step 2) was sintered at 400° C. for 8 hrs in the presence of air, to yield a positive electrode material for the lithium-ion battery comprising graphene-like structure cladded $LiMn_2O_4$.

Example 3

1) 0.088 mol of $Li_2CO_3$, 0.32 mol of $MnO_2$, and 20 mL of anhydrous ethanol were mixed (Li:Mn=1.1:4) and ground in a ball-milling tank at 400 rpm for 15 hrs. The resulting mixture was collected and allowed to stand at room temperature for 8 hrs. Thereafter, the mixture was screened using a 200 mesh sieve, and then calcined at 700° C. for 40 hrs in the presence of air, to yield a powdery lithium manganese (III, IV) oxide ($LiMn_2O_4$).

2) The powdery $LiMn_2O_4$ obtained in step 1) was added to a liquid polyacrylonitrile (LPAN), in which the weight ratio of $LiMn_2O_4$ to the liquid polyacrylonitrile was 1:0.05, and appropriate amount of ethanol was added as a solvent for ultrasonic dispersion. Thereafter, the solution was dried at room temperature for removal of the ethanol. The solution was cured at 180° C. for 6 hrs. The collected product was ground, and then calcined at 600° C. for 30 hrs in the presence of nitrogen, to yield a composite powder comprising a graphene-like structure and $LiMn_2O_4$.

3) The composite powder obtained in step 2) was sintered at 400° C. for 6 hrs in the presence of air, to yield a positive electrode material for the lithium-ion battery comprising graphene-like structure cladded $LiMn_2O_4$.

Example 4

1) 0.092 mol of $Li_2CO_3$, 0.32 mol of $MnO_2$, and 20 mL of anhydrous ethanol were mixed (Li:Mn=1:4) and ground in a ball-milling tank at 400 rpm for 15 hrs. The resulting mixture was collected and allowed to stand at room temperature for 8 hrs. Thereafter, the mixture was screened using a 200 mesh sieve, and then calcined at 750° C. for 35 hrs in the presence of air, to yield a powdery lithium manganese (III, IV) oxide ($LiMn_2O_4$).

2) The powdery $LiMn_2O_4$ obtained in step 1) was added to a liquid polyacrylonitrile (LPAN), in which the weight ratio of $LiMn_2O_4$ to the liquid polyacrylonitrile was 1:0.1, and appropriate amount of ethanol was added as a solvent for ultrasonic dispersion. Thereafter, the solution was dried at room temperature for removal of the ethanol. The solution was cured at 220° C. for 3 hrs. The collected product was ground, and then calcined at 650° C. for 25 hrs in the presence of nitrogen, to yield a composite powder comprising a graphene-like structure and $LiMn_2O_4$.

3) The composite powder obtained in step 2) was sintered at 450° C. for 4 hrs in the presence of air, to yield a positive electrode material for the lithium-ion battery comprising graphene-like structure cladded $LiMn_2O_4$.

Example 5

1) 0.096 mol of $Li_2CO_3$, 0.32 mol of $MnO_2$, and 20 mL of anhydrous ethanol were mixed (Li:Mn=1.2:4) and ground in a ball-milling tank at 400 rpm for 15 hrs. The resulting mixture was collected and allowed to stand at room temperature for 8 hrs. Thereafter, the mixture was screened using a 200 mesh sieve, and then calcined at 800° C. for 30 hrs in the presence of air, to yield a powdery lithium manganese (III, IV) oxide ($LiMn_2O_4$).

2) The powdery $LiMn_2O_4$ obtained in step 1) was added to a liquid polyacrylonitrile (LPAN), in which the weight ratio of $LiMn_2O_4$ to the liquid polyacrylonitrile was 1:0.15, and appropriate amount of ethanol was added as a solvent for ultrasonic dispersion. Thereafter, the solution was dried at room temperature for removal of the ethanol. The solution was cured at 220° C. for 3 hrs. The collected product was ground, and then calcined at 700° C. for 10 hrs in the presence of nitrogen, to yield a composite powder comprising a graphene-like structure and $LiMn_2O_4$.

3) The composite powder obtained in step 2) was sintered at 500° C. for 2 hrs in the presence of air, to yield a positive electrode material for the lithium-ion battery comprising graphene-like structure cladded $LiMn_2O_4$.

Example 6

1) 0.08 mol of $Li_2CO_3$, 0.32 mol of $MnO_2$, and 20 mL of anhydrous ethanol were mixed (Li:Mn=1:4) and ground in a ball-milling tank at 400 rpm for 15 hrs. The resulting mixture was collected and allowed to stand at room temperature for 8 hrs. Thereafter, the mixture was screened using a 200 mesh sieve, and then calcined at 750° C. for 30 hrs in the presence of air, to yield a powdery lithium manganese (III, IV) oxide ($LiMn_2O_4$).

2) The powdery $LiMn_2O_4$ obtained in step 1) was added to a liquid polyacrylonitrile (LPAN), in which the weight ratio of $LiMn_2O_4$ to the liquid polyacrylonitrile was 1:0.02, and appropriate amount of ethanol was added as a solvent for ultrasonic dispersion. Thereafter, the solution was dried at room temperature for removal of the ethanol. The solution was cured at 220° C. for 3 hrs. The collected product was ground, and then calcined at 750° C. for one hrs in the presence of nitrogen, to yield a composite powder comprising a graphene-like structure and $LiMn_2O_4$.

3) The composite powder obtained in step 2) was sintered at 500° C. for one hr in the presence of air, to yield a positive electrode material for the lithium-ion battery comprising graphene-like structure cladded $LiMn_2O_4$.

Example 7

The positive electrode materials prepared according the above examples 1-6 are employed to prepare lithium-ion batteries.

(1) Preparation of Lithium-Ion Batteries 0.4 g of composite powders comprising the graphene-like structure and $LiMn_2O_4$ obtained in Examples 1-6 were respectively mixed with 0.05 g of polyvinylidene fluoride (PVDF) which functioned as a binding agent and 0.05 of acetylene black which functioned as a conductive agent. The mixture was uniformly ground, and 5 g of N-methylpyrrolidone was added and stirred to yield uniform positive electrode slurry.

The positive electrode slurry was uniformly coated on 20 μm of aluminum foil, dried at 65° C. and punched to yield a positive wafer with a diameter of 14 mm comprising 2 mg of active $LiMn_2O_4$.

The negative electrode employed a commercially available lithium tablet special for a lithium-ion battery.

The lithium-ion battery was assembled in the form of 2032-type button batteries. The assembly sequence was that: negative shell—shrapnel—gasket—lithium tablets—electrolyte—diaphragm—electrolyte—cathode sheet—gasket—positive shell, followed by encapsulation. The whole procedure was completed in a glove box.

Performance Test of Lithium-Ion Batteries

Test of cycle performance: the 2032-type lithium-ion batteries were placed on a test system and allowed to stand for one minute. Subsequently, the lithium-ion batteries were charged by the rate of 0.1 C constant current to an upper voltage of 4.4 V, allowed to stand for another one minute, and then discharged by the rate of 0.1 C constant current to 3.0 V. Record the initial discharge capacity of the batteries. The steps were repeated 50 times, and record the discharge capacity of the batteries at each time. The capacity retention ratio is calculated according to the following formula: the capacity retention ratio after Nth discharging=(the Nth discharge capacity/the initial discharge capacity)×100. The results are listed in Table 1.

TABLE 1

| Examples | Batteries | The initial discharge capacity (mAh/g) | The capacity retention ratio after 50th discharging (%) |
| --- | --- | --- | --- |
| Example 1 | A1 | 121.3 | 96.7 |
| Example 2 | A2 | 109.1 | 94.9 |
| Example 3 | A3 | 123.6 | 94.7 |

TABLE 1-continued

| Examples | Batteries | The initial discharge capacity (mAh/g) | The capacity retention ratio after 50th discharging (%) |
|---|---|---|---|
| Example 4 | A4 | 115.9 | 97.2 |
| Example 5 | A5 | 127 | 96.1 |
| Example 6 | A6 | 140.4 | 95.5 |

Figure 2:
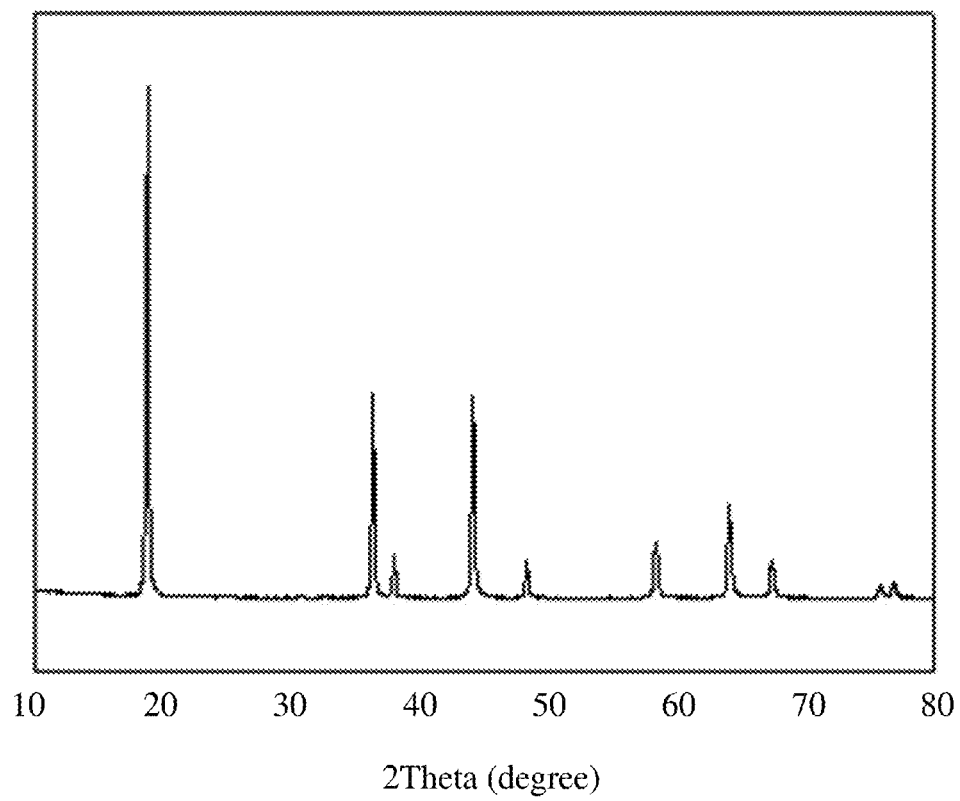
FIG. 2 is an X ray diffraction (XRD) spectrum of $LiMn_2O_4$ in accordance with one embodiment of the invention.
Figure 3:
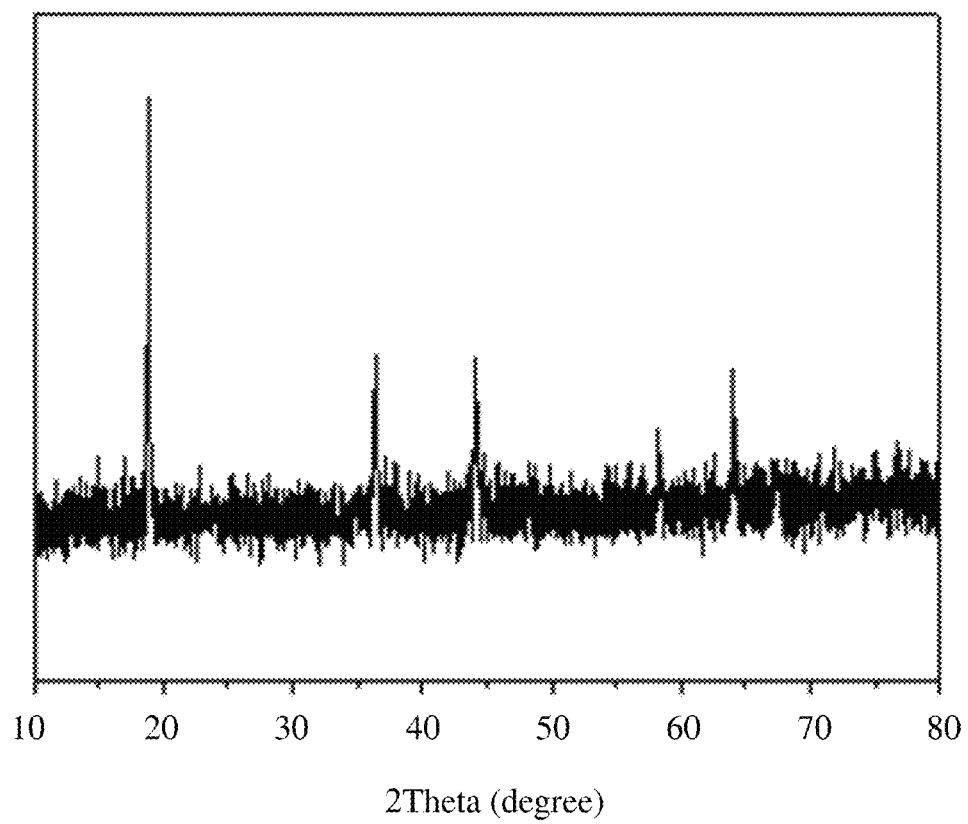
FIG. 3 is an X ray diffraction (XRD) spectrum of a positive electrode material for a lithium-ion battery in accordance with one embodiment of the invention.

FIGS. 1-3 reflect the characteristics of the positive electrode material for the lithium-ion battery prepared in Example 1.

FIG. 1 is a scanning electron microscope (SEM) of the composite powder comprising a graphene-like structure and $LiMn_2O_4$ amplified by 10,000 times, which shows that the crystalline particles of $LiMn_2O_4$ have uniform size and narrow particle size distribution.

FIG. 2 is an X ray diffraction (XRD) spectrum of $LiMn_2O_4$, which shows that $LiMn_2O_4$ has a standard spinel structure and high crystallinity.

FIG. 3 is an X ray diffraction (XRD) spectrum of the composite powder comprising a graphene-like structure and $LiMn_2O_4$, which shows that the crystal structure and strength of $LiMn_2O_4$ has changed. The precursor for forming the graphene-like structure has reducing activity, and the resulting graphene-like structure can cover $LiMn_2O_4$, thereby weakening the diffraction peak intensity of $LiMn_2O_4$.

It can be concluded from the experimental results, even under different reaction conditions, the positive electrode material for the lithium-ion battery comprising graphene-like structure cladded $LiMn_2O_4$ are prepared, all of which have good electrochemical performance. As shown in Table 1, the initial discharge capacity of the batteries are very high, and even 50 times' charging and discharging, the capacity retention ratio remains exceeding 94%, which is far higher than that in conventional lithium-ion batteries.

Unless otherwise indicated, the numerical ranges involved in the invention include the end values.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for modifying a positive electrode material for a lithium-ion battery, the method comprising:

a) providing a mixture of manganese dioxide and lithium carbonate, grinding the mixture using a ball mill, and calcining the mixture at no less than a temperature of 600° C. for no less than 20 hrs in the presence of air, to yield a powdery lithium manganese (III, IV) oxide ($LiMn_2O_4$);

b) adding polyacrylonitrile to the powdery $LiMn_2O_4$, mixing, curing at a constant temperature of no less than 180° C. for between 2 and 4 hrs, grinding, and calcining at no less than a temperature of 500° C. for between 1 and 50 hrs in the presence of an inert gas, to yield a composite powder comprising a graphene-like structure and $LiMn_2O_4$; and c) collecting the composite powder comprising the graphene-like structure and $LiMn_2O_4$, and sintering the composite powder at a temperature of between 300 and 500° C. for between 1 and 10 hrs in the presence of air, to yield the positive electrode material for the lithium-ion battery comprising graphene-like structure cladded $LiMn_2O_4$.

2. The method of claim 1, wherein in the mixture in step a), a molar ratio of manganese dioxide to lithium carbonate is between 4:1 and 4:1.2.

3. The method of claim 1, wherein in step a), the mixture is calcined at a temperature of between 600 and 800° C. for between 20 and 50 hrs.

4. The method of claim 1, wherein in step b), a weight ratio of the polyacrylonitrile to $LiMn_2O_4$ is between 0.01:1 and 0.2:1.

5. The method of claim 4, wherein the polyacrylonitrile is in the form of liquid having a relative molecular weight of between 106 and 5,000.

6. The method of claim 1, wherein in step b), a curing temperature is between 180 and 240° C.

7. The method of claim 1, wherein in step b), the inert gas is nitrogen or argon, and a calcining temperature is between 500 and 750° C.

8. The method of claim 1, wherein the graphene-like structure comprises between 10 and 100 stacked two-dimensional layers, and each layer comprises grid-like crystal lattice formed by covalent bonded single atoms.

9. A positive electrode material for a lithium-ion battery modified according to a method of claim 1, the modified positive electrode material comprising graphene-like structure cladded $LiMn_2O_4$.

* * * * *